(12) United States Patent
Xie et al.

(10) Patent No.: US 9,787,640 B1
(45) Date of Patent: Oct. 10, 2017

(54) USING HYPERGRAPHS TO DETERMINE SUSPICIOUS USER ACTIVITIES

(71) Applicant: DataVisor Inc., Santa Clara, CA (US)

(72) Inventors: Yinglian Xie, Cupertino, CA (US); Fang Yu, Sunnyvale, CA (US)

(73) Assignee: DataVisor Inc., Mountain View, CA (US)

(*) Notice: Subject to any disclaimer, the term of this patent is extended or adjusted under 35 U.S.C. 154(b) by 85 days.

(21) Appl. No.: 14/620,028

(22) Filed: Feb. 11, 2015

Related U.S. Application Data

(60) Provisional application No. 61/938,612, filed on Feb. 11, 2014.

(51) Int. Cl.
*H04L 29/06* (2006.01)

(52) U.S. Cl.
CPC .......... *H04L 63/0263* (2013.01); *H04L 63/14* (2013.01)

(58) Field of Classification Search
CPC ............................. H04L 63/0263; H04L 62/14
See application file for complete search history.

(56) References Cited

U.S. PATENT DOCUMENTS

| | | | | |
|---|---|---|---|---|
| 8,418,249 B1* | 4/2013 | Nucci | ................... | G06F 21/552 706/20 |
| 8,887,286 B2* | 11/2014 | Dupont | ................... | G06F 21/00 726/25 |
| 9,069,963 B2* | 6/2015 | Barnes, II | ............. | G06F 21/562 |
| 2012/0137367 A1* | 5/2012 | Dupont | ................... | G06F 21/00 726/25 |
| 2014/0317736 A1* | 10/2014 | Cao | ..................... | H04L 63/1483 726/23 |
| 2015/0047034 A1* | 2/2015 | Burnham | ............ | H04L 63/1441 726/23 |

OTHER PUBLICATIONS

*Dense Subgraph*. Wikipedia, the free Encyclopedia. Last modified Dec. 9, 2014. Retrieved on Feb. 11, 2015. Retrieved from the Internet: URL<http://en.wikipedia.org/w/index.php?title=Dense_subgraph>. 2 pages.
*Disjoint-Set Data Structure*. Wikipedia, the free Encyclopedia. Last modified Feb. 2, 2015. Retrieved on Feb. 11, 2015. Retrieved from the Internet: URL<http://en.wikipedia.org/wiki/Union_find>. 6 pages.

(Continued)

*Primary Examiner* — Saleh Najjar
*Assistant Examiner* — Devin Almeida
(74) *Attorney, Agent, or Firm* — Fish & Richardson P.C.

(57) ABSTRACT

Methods, systems, and apparatus, including computer programs encoded on computer storage media, for detecting suspicious user activities. One of the methods includes generating hypergraphs, wherein the hypergraphs include nodes corresponding to feature profiles and edges between particular nodes representing a measure of similarity between nodes; using the generated hypergraphs to detect suspicious graph nodes; and using the suspicious graph nodes to detect malicious user communities.

19 Claims, 2 Drawing Sheets

(56) References Cited

OTHER PUBLICATIONS

*Jaccard Index.* Wikipedia, the free Encyclopedia. Last modified Nov. 22, 2014. Retrieved on Feb. 11, 2015. Retrieved from the Internet: URL<http://en.wikipedia.org/wiki/Jaccard_index>. 6 pages.
*Kullback-Leibler Divergence.* Wikipedia, the free Encyclopedia. Last modified Jan. 16, 2015. Retrieved on Feb. 11, 2015. Retrieved from the Internet: URL<http://en.wikipedia.org/wiki/Kullback%E2%80%93Leibler_divergence>. 11 pages.
*Tarjan's Strongly Connected Components Algorithm.* Wikipedia, the free Encyclopedia. Last modified Jan. 16, 2015. Retrieved on Feb. 11, 2015. Retrieved from the Internet: URL<http://en.wikipedia.org/wiki/Tarjan's_strongly_connected_components_algorithm>. 4 pages.

* cited by examiner

USING HYPERGRAPHS TO DETERMINE SUSPICIOUS USER ACTIVITIES

CROSS-REFERENCE TO RELATED APPLICATIONS

This application claims the benefit under 35 U.S.C. §119(e) of the filing date of U.S. Patent Application 61/938,612, which was filed on Feb. 11, 2014, and which is incorporated here by reference.

BACKGROUND

This specification relates to detecting suspicious user activities.

The flourish of online services has attracted numerous attackers to conduct a wide range of nefarious activities, ranging from spam posts, phishing emails, fake invitations, cheated games, artificially promoted ads, to fraudulent financial transactions. Recent observations have identified an increased number of attacks of different forms, affecting online services of all sizes, for example, ranging from millions of compromised accounts to hundreds of millions fake accounts being crated on various social networking sites and numerous small online forums.

Although each attack may look different in scale and method, a common thread typically found among them is the requirement of a large number of malicious user accounts. These accounts can either be newly created or can be obtained by compromising real user accounts. Detecting malicious accounts and compromised user accounts is thus ultimately critical to ensure the success of all online services.

SUMMARY

The system described in this specification constructs and analyzes several types of activity graphs, referred to as hypergraphs, to detect malicious (or compromised) accounts and malicious events without using training data. A global view of the connectivity structures among users and events allows the system to perform early detection of stealthy attack patterns that are difficult to identify when each user or event is examined in isolation.

Each node on a particular hypergraph may correspond to a set of events or a set of users, with edge attributes specifying their connectivity relationship. On top of these constructed graphs, the system applies community detection algorithms and then outputs suspicious graph components. In addition, these graphs are dynamically evolving over time, allowing the system to spot abnormal graph components.

The output graph component information can be combined with individual user or event information to generate an initial list of malicious accounts with a high confidence, as they have exhibited stronger global correlations in conducting malicious activities.

The hypergraph based detection can identify groups of malicious accounts without requiring labeled data provided by the customers. The labeled data are often hard to obtain, especially with new unseen attacks. With hypergraph analysis, the system can self-bootstrap the system with an initial list of malicious accounts or events. This step also has the ability to capture new attack campaigns automatically.

In general, one innovative aspect of the subject matter described in this specification can be embodied in methods that include the actions of generating hypergraphs, wherein the hypergraphs include nodes corresponding to feature profiles and edges between particular nodes representing a measure of similarity between nodes; using the generated hypergraphs to detect suspicious graph nodes; and using the suspicious graph nodes to detect malicious user communities. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. In the hypergraph, the feature profile corresponding to each node is a profile created for a set of user accounts or a set of user events. Each feature profile is a combination of features and wherein feature profiles can include user profiles, group profiles, and a global profile. Determining the measure of similarity between nodes includes comparing feature values between the respective nodes. Edges are pruned according to normal user behaviors, leaving only edges that contains some suspicious behavior. Detecting suspicious graph nodes comprises comparing a feature profile associated with each graph node to a global feature profile that captures common behavior of a population of users. The method further includes: identifying additional suspicious graph nodes based on an initial list of suspicious graph nodes and the graph structure, using a graph diffusion process. Using the suspicious graph nodes to detect malicious graph communities includes: using one or more graph algorithms to generate sub-graphs each corresponding to a graph community; examining each graph community to determine whether it is a suspicious community based on the relative fraction of suspicious nodes in the graph community; and outputting the nodes of communities determined to be suspicious communities as suspicious community nodes. The method further includes building a community profile for each suspicious community and determining whether an individual user is likely to be a malicious user by comparing the community profile to a profile of the individual user. The method further includes comparing users in each suspicious community over time and identifying users that are transient as malicious users using dynamic graph analysis. The method further includes detecting suspicious users from a suspicious community based on a predefined set of rules.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
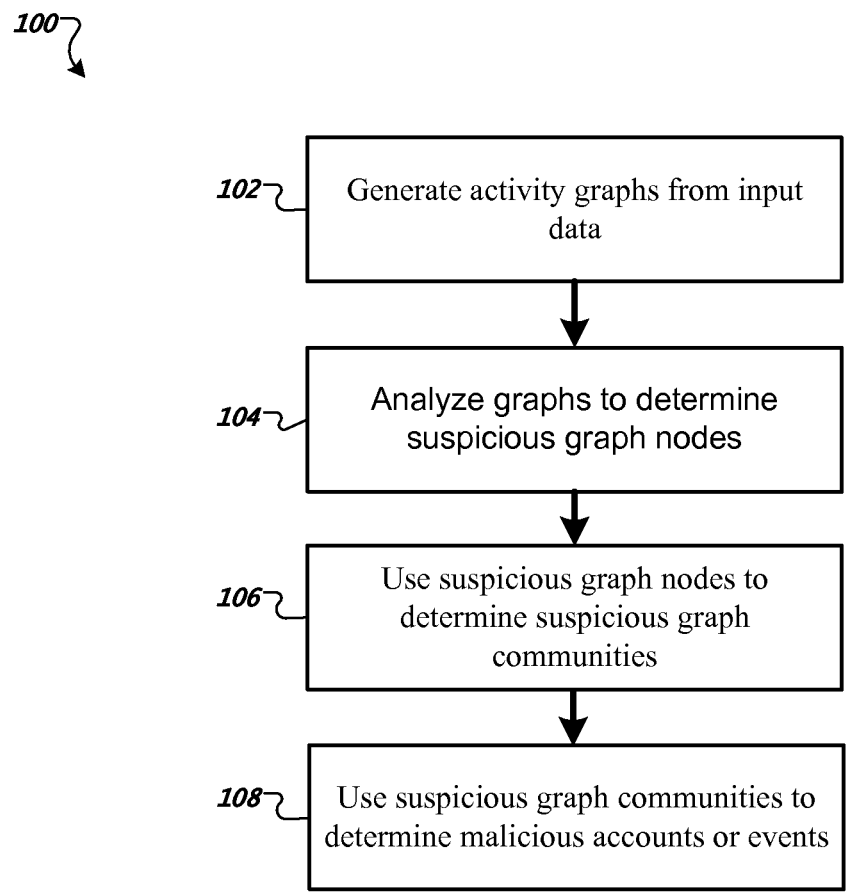
FIG. 1 is an example method of detecting malicious or compromised accounts.

The present specification describes techniques for using hypergraphs to detect malicious or compromised accounts and malicious events without using training data. In particular, the specification describes techniques for generating hypergraphs using feature profiles. After generating the hypergraphs they are analyzed to determine suspicious graph nodes.

Conventional defense systems focus on the last stage of the attacks for detection, i.e., when the malicious accounts were actually used to abuse service and perform attacks, for example, posting ads, spamming, abusing computation resources on cloud-computing environments, or performing fraudulent transactions. As attack formats and methods frequently evolve, it is often difficult to detect new attacks.

Therefore, most of the conventional detection systems are reactive. They typically are effective only after the attack has happened; in particular after the new attack patterns have been observed and learned by manual efforts. For example, by examining new fraudulent transactions or spam campaigns, human experts can derive new rules or generate new content signatures. These solutions have drawbacks, for example: 1) They are often effective after attackers have conducted malicious activities. So damage may have already occurred. Even if the systems effectively detected these accounts and blocked them, it may not impact the attack eco-system because attackers can always sign up free new accounts again with a low cost. 2) The detection results are often incomplete. Such solutions can detect only actively attacking accounts, while missing a large number of malicious accounts that are still in various incubation stages.

In addition, most attack detection systems work in isolation. 1) They usually examine each event individually, losing the power of a global view to detect large-scale, coordinated attacks. 2) They often rely on experts to manually create rules or other attack signatures. As attacks get increasing stealthy, it is difficult for human experts to manually discover new sophisticated attack patterns that involve many different types of events and steps. 3) They often rely on many application specific signals, such as post contents or financial transaction details. These signals are specially crafted for each service and site. They are hard to transfer to other systems.

In contrast with the conventional attack detection systems, the systems and techniques described in the present specification specifically focus on account security. The aim is to secure every "good" user's account and detect all attacker-created malicious accounts.

Architecture

A big data analytics engine can be constructed to provide account security as a service. In some implementations, the big data analytics engine operates on a cloud. In some other implementations it operates on a server system, e.g., for a particular company. The input to the system includes Web logs that are readily available from many services (e.g., account sign-in and sign-up logs). Consequently, the architecture does not require individual customers to purchase additional hardware. Through data analysis, the big data analytics engine can automatically detect fake accounts, compromised accounts, and various malicious account activities, e.g., spam, phishing, fraudulent transactions or payments. The system sends back detection results both in real-time and through periodic updates.

Through detecting malicious/compromised accounts, the system can pro-actively help fighting different forms of malicious activities, e.g., spam, phishing, cloud-computing abuse, fraudulent transactions or payments.

Inputs:

The system uses user event logs as inputs. Example event logs include user login log, signup log, or transaction logs.

Fields for each event include:
1. Event type: e.g., sign-up, login, post-comment, payment
2. Event success: 0 or success 1 for failure
3. User name or user identifier (ID) (user identity can be anonymized)
4. Login timestamp
5. Login IP address In some implementation the above 5 fields are used in the hypergraph analysis. The user IDs can be anonymized. However, the anonymization process is configured to preserve a 1-1 mapping between the real user ID and an anonymized user ID, so that the system can keep track of a user's activity. The real user IDs often provide information for detection as well, since malicious accounts often have strong naming patterns.

Other information or meta-data regarding a user event is not required, but can help increase the detection coverage and accuracy. The system can optionally obtain the following fields from user events:
1. User-agent of the event
2. For a transaction event, the transaction amount, and the associated payment or purchase information (e.g., Paypal account ID or purchased products). The system does not need credit card or bank account information.

Example inputs are illustrated in Table 1 below:

TABLE 1

| Event ID | Event type | Event success | UserID | Timestamp | IP address |
|---|---|---|---|---|---|
| 1 | Login | 0 | HE12BN | 11/20/2013 12:35:06 | 128.2.34.5 |
| 2 | Signup | 1 | AXV34K | 11/20/2013 13:05:35 | 100.25.7.39 |
| 3 | Post | 1 | G8VBOM | 11/21/2013 09:11:47 | 23.9.44.37 |

Graph Analysis

A key component of the system's detection engine is graph analysis. During graph analysis, the system constructs activity graphs and identifies suspicious graph components. FIG. 1 shows an example method 100 of detecting malicious or compromised accounts.

The system constructs different types of activity graphs, which will be referred to as hypergraphs (102). The system then analyzes the graphs to determine suspicious graph nodes (104). The system uses the suspicious graph nodes to determine suspicious graph communities (106) and the system uses the suspicious graph communities to determine malicious accounts or events (108).

Graph Construction

To build the hypergraphs, the system first processes input data and derives a set of features and statistics for each user account (or each user event).

A feature can be of three different forms: a numerical number (e.g., the number of logins of a user, the number of the users observed from the event IP address), a set of items (e.g., the top 10 keywords posted by the user), or a histogram representing a distribution (e.g., the keyword usage distribution for a user).

The combination of all features or statistics is referred to as a profile. For each user, the system can compute a corresponding profile. In addition, for each of one or more groups of users, the system can compute a corresponding group profile. Collectively across an entire user population available to the system, a global profile can be computed.

Figure 2:
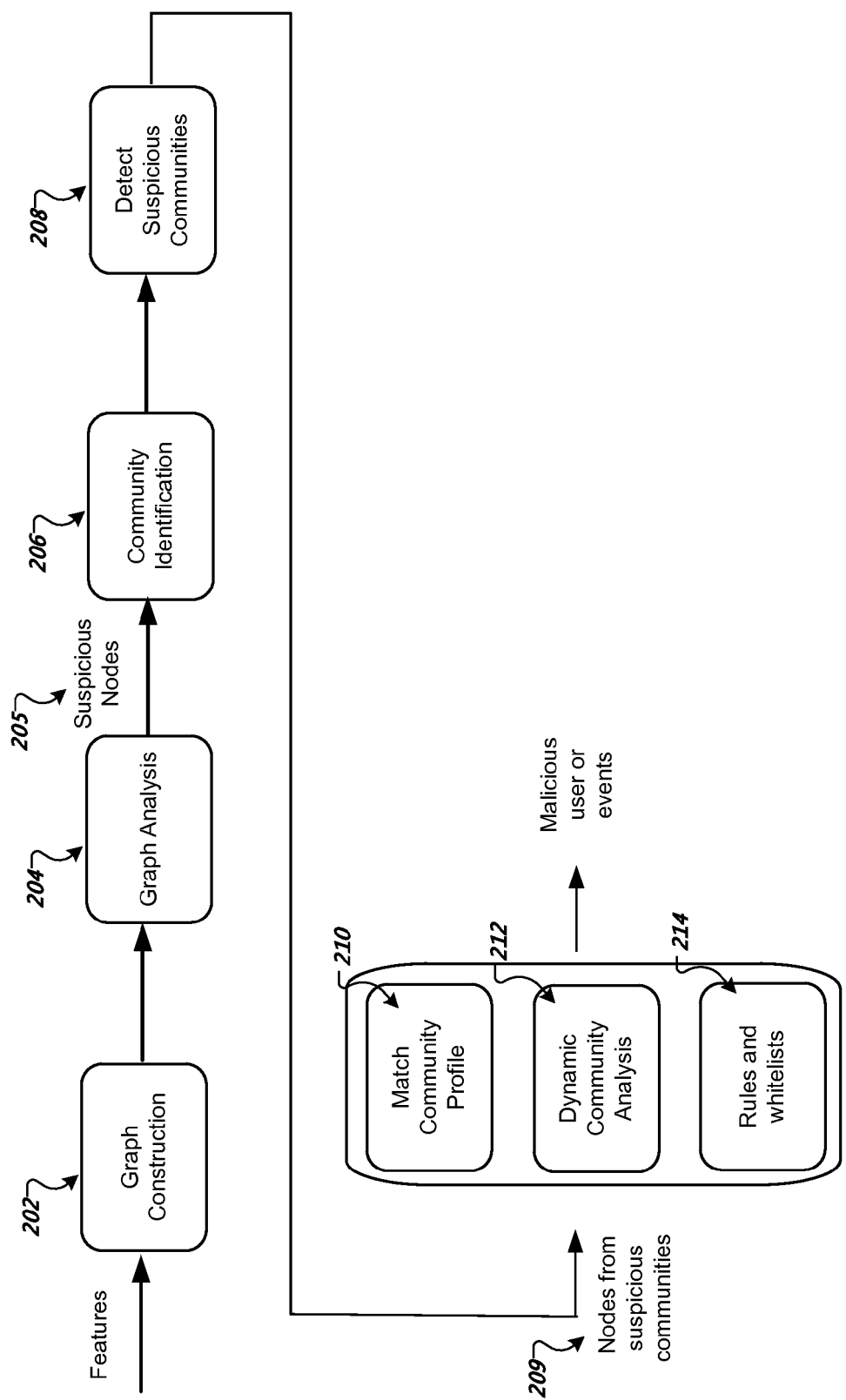
FIG. 2 is diagram representing a process flow for a hypergraph analysis.

The set of computed feature profiles will be used to construct hypergraphs for graph analysis (202 of FIG. 2). Each node on a graph corresponds to a feature profile. Each feature profile can be constructed from a set of correlated events or a set of correlated accounts. In some implementations, the set of correlated events or correlated user accounts is identified by taking the set of events or the set of accounts that appeared from the same IP address within a specified time window. In some other implementations, the set of correlated events or correlated user accounts is identified by taking the set of events or the set of accounts from the same device according to some form of device fingerprints, e.g., a user-agent string. In some other implementations, the set of correlated events or correlated user accounts is identified by taking a set of similar events or users with similar behaviors.

The edges of the graphs may be computed in multiple ways. In some implementations, the edges are computed by adding an edge between node A and node B, if A and B share a similar feature.

To determine if two features are similar, the system can perform the following procedures. If the feature corresponds to a numerical value, then the system can compare their respective values. In some implementations, the system checks whether the difference between two corresponding feature values is smaller than a pre-set threshold. Alternatively, in some other implementations, the system checks whether the ratio of two features value is smaller than a pre-set threshold.

In some implementations, if a feature corresponds to a set of items, e.g., a set of keywords, the similarity can be computed using, for example, a Jaccard index value (also called as the Jaccard similarity coefficient value), computed in terms of the overlapped items between the two sets divided by the total number of items across the two item sets. An example of using a Jaccard index can be found at http://en.wikipedia.org/wiki/Jaccard_index, which is incorporated by reference.

In some implementations, if a feature corresponds to a histogram, the system can convert the histograms into probability distributions and then compute the similarity using KL-divergence. An example of the KL divergence value can be found at http://en.wikipedia.org/wiki/Kullback%E2%80%93Leibler_divergence, which is incorporated by reference. If the KL-divergence is smaller than a pre-set threshold, then the two features are considered similar. Alternatively, the system can also examine if the two histograms share the same dominant value, which is defined as the feature value with the most number of occurrences in the histogram.

The computed edges are undirected and each edge has a corresponding weight. The weight is computed based on counting the number of feature dimensions that are similar between two nodes.

The system can further prune the edges using a global profile computed across the entire user population or across the entire set of events. If the similar feature values between two nodes are common feature values according to the global profile, then the corresponding edge can be pruned (or the edge weight get reduced) For each feature, to determine if a feature value is a common feature value from a global profile, the system may examine the percentage of its occurrences. If the percentage is larger than a pre-set threshold, the feature value is considered a common value. For example, if a large number of accounts registered the service on day X and two nodes have an edge because the two feature profiles share the same registration date of day X, then the system can prune this edge.

Suspicious Graph Node Detection

After constructing the hypergraphs, the system identifies suspicious graph nodes (205 of FIG. 2) by first examining each graph node individually (204 of FIG. 2). Since each graph node corresponds to a feature profile computed from a set of accounts or a set of events, this step detects whether a feature profile is suspicious by comparing it against a global feature profile derived from the collection of all available user accounts or the collection of all available events. The global profile captures the common behaviors of the overall population. It serves as the baseline of comparison to determine whether a specific feature profile, derived from a set of users or a set of events, is suspicious.

To compare a particular feature profile against the global profile (as baseline), the system compares the two profiles feature by feature. For each feature, the system computes whether the current feature histogram is suspicious when compared to the global feature histogram. There could be different statistical techniques that are suitable for comparing profiles. One technique is to check whether the most common features in the current feature histogram also appear as the most common features in the global feature histogram. Another technique is to determine whether the current feature histogram misses top popular feature values in the global feature histogram.

Detect Additional Suspicious Nodes Using Graph Diffusion

The above step provides an initial list of suspicious graph nodes, i.e., suspicious profiles. To enhance the detection coverage, the system may apply graph diffusion techniques to identify more graph nodes that are also likely suspicious based on the hypergraph structures.

The graph diffusion process infers a score indicating the level of suspiciousness for each graph node. This process begins with assigning a high suspiciousness score (e.g., 1) to each suspicious graph node identified using the suspicious node detection by comparing with the global profile. The remaining nodes are all assigned an equal low suspiciousness score (e.g., 0). Then the system propagates the score of a node to its neighboring connected nodes.

One example approach of such score propagation is to divide the score of every node to its edges based on edge weight and re-aggregate them. The new score of a node S is the sum of two computed scores S1 and S2, i.e., S=S1+S2. Here $S1=(S1_{old})\times(m)$, where $S1_{old}$ is the original suspiciousness score for this node and m is a pre-defined weight. S2 represents the sum of scores the node receives from its edges (propagated from its neighboring nodes) times n, where n is a second pre-defined weight. This step can be repeated a specified number of times (e.g., 4-5 times). The final high suspiciousness score indicates whether the node itself is very suspicious, or whether the node has strong connections with many suspicious neighbors within a few hops.

At the end of the graph diffusion process, the system outputs a list of graph nodes with suspiciousness scores higher than a pre-set threshold.

Suspicious Community Detection

Once the system obtains a list of suspicious graph nodes, it proceeds to identify suspicious graph communities (208 of FIG. 2).

Graph communities can be identified (206 of FIG. 2) using several different graph algorithms, for example, connected components, strongly connected components, and dense sub-graphs. A connected component of a graph is a sub-graph component where there exist an undirected graph path between any two nodes on the component, but there exist no path between a node on this component and a node outside this component.

One way to identify connected graph components is to apply a union find process, an example implementation of which is described in http://en.wikipedia.org/wiki/Union_find, which is incorporated by reference.

A strongly connected component of a graph is a subgraph component, where there exist a directed graph path between any two nodes on the component. One example technique to identify strongly connected graph components is to apply the Tarjan algorithm, an example implementation is described in http://en.wikipedia.org/wiki/Tarjan's_strongly_connected_components_algorithm, which is incorporated by reference.

A dense sub-graph of a graph is a sub-graph that has high density, where density is defined as number of internal edges to the number of sub-graph nodes. One example technique to identify dense sub-graph is through finding dense k-sub-graph, which is described in http://en.wikipedia.org/wiki/Dense_subgraph, incorporated herein by reference.

After running one or more graph algorithms, each connected component or each dense sub-graph region may be identified as corresponding to a graph community.

Each community can further be examined to determine whether it is a suspicious community. In some implementations, a suspicious community is determined based on a determination of a fraction of suspicious nodes, identified as described above, within the community. If the fraction is high, determined based on a preset threshold, the users of the whole graph community may be identified as suspicious.

All the nodes from suspicious communities may be output as suspicious nodes (209 of FIG. 2). The set of events and user accounts corresponding to these malicious nodes may be output as suspicious events and suspicious accounts.

Malicious Activity Detection

After identifying suspicious graph communities, the system proceeds to detect malicious accounts or malicious events. Different approaches can be used to detect malicious accounts or malicious events. These approaches can be conducted separately or can be combined together to have a lower false positive rate in detection.

A first approach is to build a community profile for each suspicious community by combining accounts or events across the entire community as one population (210 of FIG. 2). After the system computes the community profile, the system examines whether an individual user's profile or individual event's profile is very similar to the community profile. The similarity of two profiles is computed feature by feature using the same procedure presented above for feature similarity computation. If the individual user's profile is very similar to the community profile, i.e., the number of similar features is greater than a pre-set threshold, then the system can consider the user a likely malicious user (or event). Otherwise, the user (or event) may be a false positive.

A second approach is to consider all the users or all the events from a community as candidates for malicious users (or events) and prune them using a set of rules, heuristics, or whitelists (214 of FIG. 2). For example, if a user from certain IP address ranges are known good users, then the system can prune such users from the candidate sets. After pruning, the system can output the remaining set of users (or events) as malicious users (or events).

A third approach is to leverage dynamic graphs and dynamic community information (212 of FIG. 2). Truly malicious users or events are usually transient events from short-lived attack campaigns, so they are not likely from persistent graph nodes, i.e., group with the same set of users for a long time. Consequently, the system may keep the community information from historical data to perform analysis in this step. If the same set of users keep forming a stable community over time, then even though the community is marked as suspicious temporarily, the system can safely prune such users. For the remaining users (or events) that are from short-lived suspicious communities, the system can output them as malicious users or malicious events.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:
1. A method comprising:
processing input data to derive a set of features for each user account or event for a plurality of user accounts;
generating a set of feature profiles, each feature profile having a set of features derived from a profile constructed from a set of correlated events or a set of correlated user accounts;
generating hypergraphs, wherein the hypergraphs include nodes corresponding to feature profiles and edges between particular nodes representing a measure of similarity between nodes, wherein the measure of similarity between a pair of nodes is based at least in part on a comparison of a plurality of feature values associated with each node of the pair of nodes and weighting the edges based on the comparison;
using the generated hypergraphs to detect suspicious graph nodes based on the respective feature profiles of each graph node and a global feature profile;
using the suspicious graph nodes to detect malicious graph communities; and using the malicious graph communities to determine whether a particular user account is likely to correspond to a malicious user.

2. The method of claim 1, wherein, in the hypergraph, the feature profile corresponding to each node is a profile created for a set of user accounts or a set of user events.

3. The method of claim 1, wherein each feature profile is a combination of features and wherein feature profiles can include user profiles, group profiles, and a global profile.

4. The method of claim 1, wherein edges are pruned according to normal user behaviors, leaving only edges that contains some suspicious behavior.

5. The method of claim 1, wherein detecting suspicious graph nodes comprises comparing a feature profile associated with each graph node to a global feature profile that captures common behavior of a population of users.

6. The method of claim 1, further comprising: identifying additional suspicious graph nodes based on an initial list of suspicious graph nodes and the graph structure, using a graph diffusion process.

7. The method of claim 1, wherein using the suspicious graph nodes to detect malicious graph communities comprises:
   using one or more graph algorithms to generate subgraphs each corresponding to a graph community;
   examining each graph community to determine whether it is a suspicious community based on the relative fraction of suspicious nodes in the graph community; and
   outputting the nodes of communities determined to be suspicious communities as suspicious community nodes.

8. The method of claim 7, further comprising building a community profile for each suspicious community and determining whether an individual user is likely to be a malicious user by comparing the community profile to a profile of the individual user.

9. The method of claim 7, further comprising comparing users in each suspicious community over time and identifying users that are transient as malicious users using dynamic graph analysis.

10. The method of claim 7, further comprising detecting suspicious users from a suspicious community based on a predefined set of rules.

11. A system comprising:
    one or more computers configured to perform operations comprising:
    processing input data to derive a set of features for each user account or event for a plurality of user accounts;
    generating a set of feature profiles, each feature profile having a set of features derived from a profile constructed from a set of correlated events or a set of correlated user accounts;
    generating hypergraphs, wherein the hypergraphs include nodes corresponding to feature profiles and edges between particular nodes representing a measure of similarity between nodes, wherein the measure of similarity between a pair of nodes is based at least in part on a comparison of a plurality of feature values associated with each node of the pair of nodes and weighting the edges based on the comparison;
    using the generated hypergraphs to detect suspicious graph nodes based on the respective feature profiles of each graph node and a global feature profile;
    using the suspicious graph nodes to detect malicious graph communities; and
    using the malicious graph communities to determine whether a particular user account is likely to correspond to a malicious user.

12. The system of claim 11, wherein determining the measure of similarity between nodes includes comparing feature values between the respective nodes.

13. The system of claim 11, wherein edges are pruned according to normal user behaviors, leaving only edges that contains some suspicious behavior.

14. The system of claim 11, wherein detecting suspicious graph nodes comprises comparing a feature profile associated with each graph node to a global feature profile that captures common behavior of a population of users.

15. The system of claim 11, further configured to perform operations comprising: identifying additional suspicious graph nodes based on an initial list of suspicious graph nodes and the graph structure, using a graph diffusion process.

16. The system of claim 11, wherein using the suspicious graph nodes to detect malicious graph communities comprises:
    using one or more graph algorithms to generate subgraphs each corresponding to a graph community;
    examining each graph community to determine whether it is a suspicious community based on the relative fraction of suspicious nodes in the graph community; and
    outputting the nodes of communities determined to be suspicious communities as suspicious community nodes.

17. The system of claim 16, further configured to perform operations comprising building a community profile for each suspicious community and determining whether an individual user is likely to be a malicious user by comparing the community profile to a profile of the individual user.

18. The system of claim 16, further configured to perform operations comprising comparing users in each suspicious community over time and identifying users that are transient as malicious users using dynamic graph analysis.

19. The system of claim 16, further configured to perform operations comprising detecting suspicious users from a suspicious community based on a predefined set of rules.

* * * * *